United States Patent [19]
Yamamoto et al.

[11] Patent Number: 4,533,937
[45] Date of Patent: Aug. 6, 1985

[54] KEY SIGNAL GENERATING APPARATUS FOR DIGITAL CHROMAKEY SYSTEM

[75] Inventors: Kaichi Yamamoto, Zama; Jun Yonemitsu, Atsugi, both of Japan

[73] Assignee: Sony Corporation, Tokyo, Japan

[21] Appl. No.: 416,329

[22] Filed: Sep. 9, 1982

[30] Foreign Application Priority Data

Sep. 12, 1981 [JP] Japan ................................ 56-144535

[51] Int. Cl.³ .......................................... H04N 9/535
[52] U.S. Cl. .................................................... 358/22
[58] Field of Search .................................. 358/22, 183

[56] References Cited
U.S. PATENT DOCUMENTS 4,389,664  6/1983  Robitzch ................................ 358/22
4,394,680  7/1983  Watanabe ................................ 358/22

OTHER PUBLICATIONS

International Broadcast Engineer, vol. 11, No. 173, Sep. 1980.

Primary Examiner—Michael A. Masinick
Attorney, Agent, or Firm—Lewis H. Eslinger; Alvin Sinderbrand

[57] ABSTRACT

A key signal generating apparatus for a digital chromakey system for generating a key signal in accordance with the difference between a reference hue corresponding to a back color data and a hue of an input video data in U-V chroma signal coordinates, in which the gain of key signal is determined by quadratic curve groups in the U-V chroma signal coordinates.

14 Claims, 20 Drawing Figures

FIG. 5B (KEY)

FIG. 5C (KEY')

KEY SIGNAL GENERATING APPARATUS FOR DIGITAL CHROMAKEY SYSTEM

CROSS-REFERENCE OF THIS APPLICATION

This application corresponds to U.S. Disclosure Document program Ser. No. 102754 filed Sept. 9, 1981.

BACKGROUND OF THE INVENTION

1. Field of the Invention

The present invention relates to a key signal generating apparatus for digital chromakey system.

2. Description of the Prior Art

Figure 1:
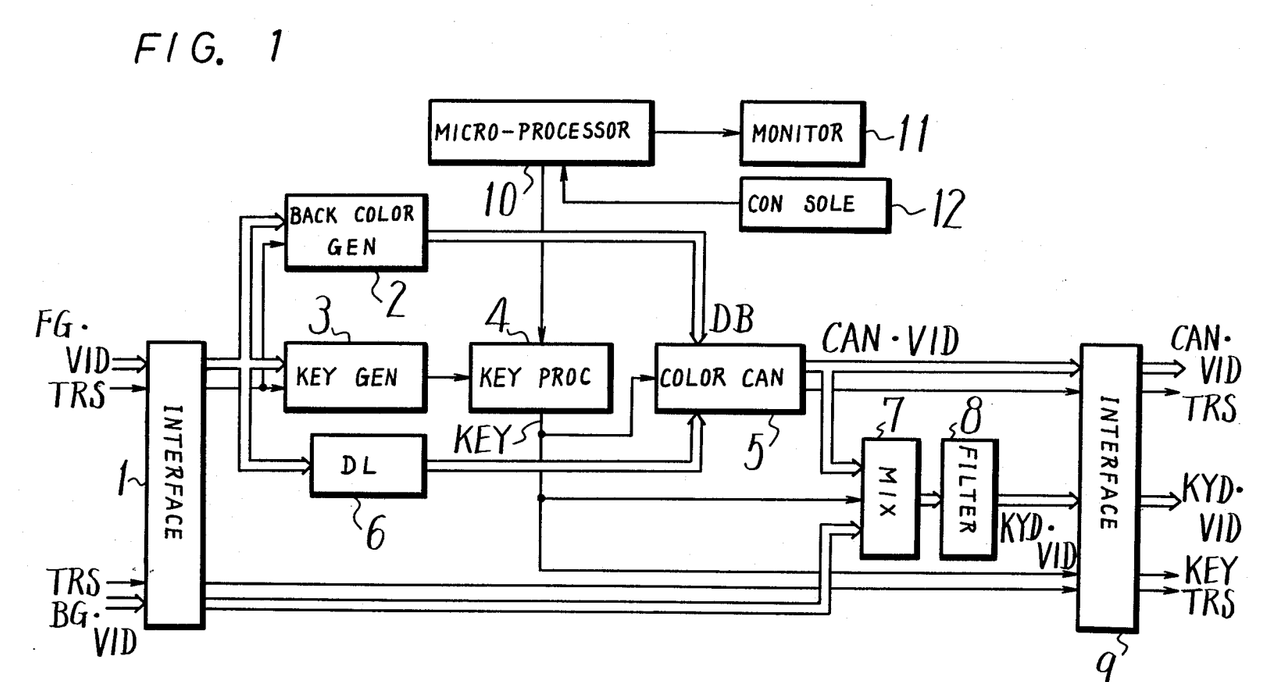
FIG. 1 is a block diagram schematically showing an entire construction of a digital chromakey apparatus to which the invention is applicable.

FIG. 1 is a block diagram showing an overall arrangement of a digital chromakey apparatus to which this invention is applicable. In the figure, reference 1 denotes an interface to which a foreground color video data signal FG. VID and a background color video data signal BG. VID each being associated with a timing reference signal TRS are supplied. The above color video data signals FG. VID and BG. VID are formed of respective components provided by sampling a luminance signal Y and color difference signals U and V, each of which is formed by matrix calculation of output signals R, G and B from a color television camera, at the sampling frequency ratio of, for instance, 14:7:7. The interface 1 takes the timing signals (horizontal sync. signal, vertical sync. signal and the like) decoded from the respective timing reference signals TRS into consideration, then makes the phases of two colors video data signals FG. VID and BG. VID appropriate ones, and then delivers the same to the next stage.

Reference 2 denotes a back color data generator which forms a back color data signal from the foreground color video data signal FG. VID and supplies the same to a key signal generator 3 and a color canceller 5.

The key signal generator 3 compares the back color data signal with the foreground color video data signal FG. VID at every corresponding sample thereof to allow the generation of a key signal with a predetermined level. Since the key signal per se thus developed has so many external disturbances, it can not be utilized as it is. Therefore, as will be discussed later, the key signal is supplied to a key processor 4, whereby it is subjected to waveform shaping processes such as clipping, adjustment of edge timings of this clipped output, adjustment of gain and the like. Thus the key processor 4 produces a key signal KEY.

The color canceller 5 eliminates the back color data from the foreground color video data signal FG. VID on the basis of the above key signal KEY. For instance, when an object 14 (FIGS. 3A to 3D) is transparent, the transparent back color is removed. To be more concrete, the back color data is amplitude-modulated by the key signal KEY so as to subtract the modulated output from the foreground color video data signal FG. VID. The elimination of the back color is intended for only the color difference signals U and V, while the luminance signal Y is merely passed through the color canceller 5.

The color canceller 5 is supplied with the foreground color video data signal FG. VID by way of a delay circuit 6. The delay circuit 6 has a delay time corresponding to the time needed by the key processor 4 in its waveform shaping processes mentioned before.

An output CAN. VID of the color canceller 5 and the background color video data signal BG. VID are supplied to a mixer 7, in which they are mixed on the basis of the key signal KEY applied thereto. Other than a method for simply switching two color video data signals CAN. VID and BG. VID to each other, the above mixing operation can use a so-called cross fade method in which at the boundary between the data, the level of one data is gradually decreased, while the level of the other data is gradualy increased in a direction transverse with respect to the boundary. The output of the mixer 7 is supplied through a digital filter 8 to an interface 9. The digital filter 8 serves to shape the waveform of the output derived from the mixer 7.

The interface 9 permits the color video data signal CAN. VID, the colors of which are removed and derived from the color canceller 5, the mixed color video data signal KYD. VID from the digital filter 8, the respective timing reference signals TRS and the key signal KEY to be developed to the outside.

In addition, the microprocessor 10, a CRT (cathode ray tube) monitor 11 and a console 12 are provided, in which the translation of a user key input from the console 12, the transfer of the above translation into the inside of the system, the calculation processings required by respective circuit blocks and the like are possible.

The aforesaid digital chromakey apparatus operates at a sampling clock frequency corresponding to the sampling rate of the color difference data.

Figure 2:
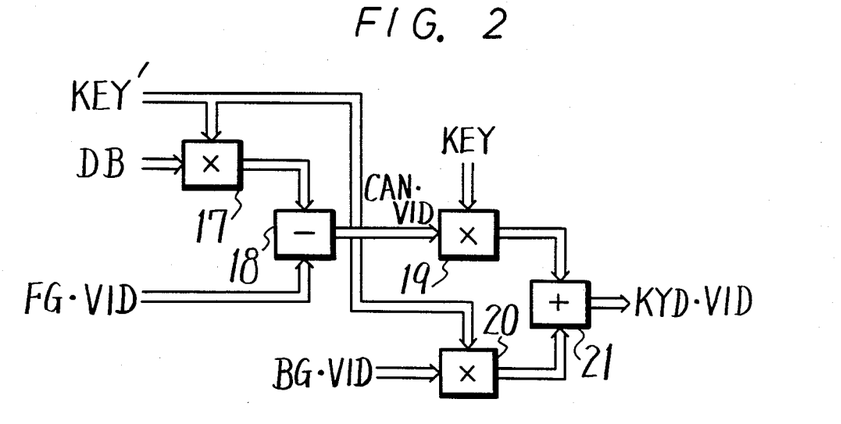
FIG. 2 is a block diagram schematically showing an outline construction of a color canceller and a mixer.
Figure 3A:
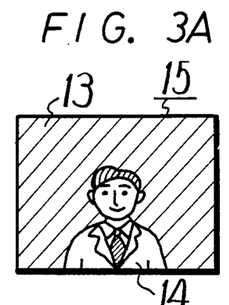
FIGS. 3A through 3F are respectively schematic diagrams useful for explaining the operation of the same.
Figure 3B:
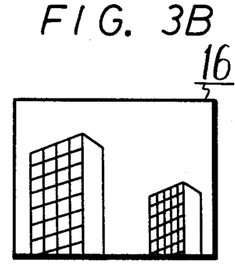
Figure 3C:
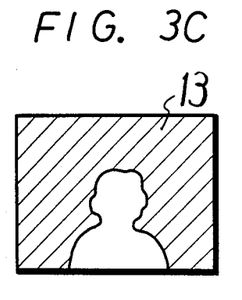
Figure 3D:
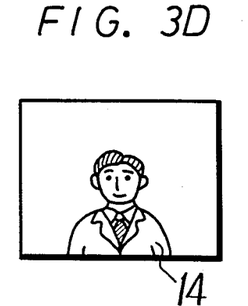
Figure 3E:
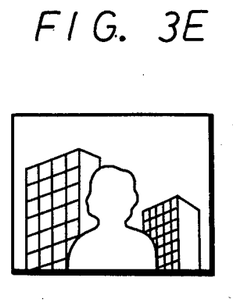
Figure 3F:
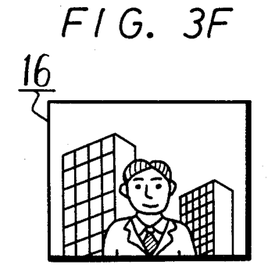

FIG. 2 shows in block the principle of the color canceller 5 and mixer 7 using the key signal KEY. Taking the key signal KEY shown in FIG. 5B as an example, the key signal KEY is converted to a key signal KEY' shown in FIG. 5C. This key signal KEY' is supplied to a multiplier 17 so as to modulate the back color signal DB derived from the back color data generator 2 (FIG. 1). The output of the multiplier 17 is supplied to a subtractor 18 thereby subtracted from the foreground color video data signal FG. VID. Thus the subtractor 18 derives the video data signal CAN. VID from the color video data signal FG. VID from which have been removed the data which corresponds with the object 14 and the back color of the object 14. The aforesaid operations are all performed by the color canceller 5 in FIG. 1.

Moreover, in a multiplier 19 the video data signal CAN. VID is modulated by the key signal KEY and in a multiplier 20 the background video data signal BG. VID is modulated by the key signal KEY'. Then, the outputs of the both the multipliers 19 and 20 are added to each other in an adder 21. The output video data KYD. VID of the adder 21 affects the picture so that the background picture becomes transparent when the object 14 is transparent as described previously. Owing to the slope of the edge of the key signal KEY, at the boundary between the object 14 and the background 16, the cross fade is performed to incur the gradual switchings of the pictures from one to another thus rendering the boundary of the pictures quite natural.

Figure 4:
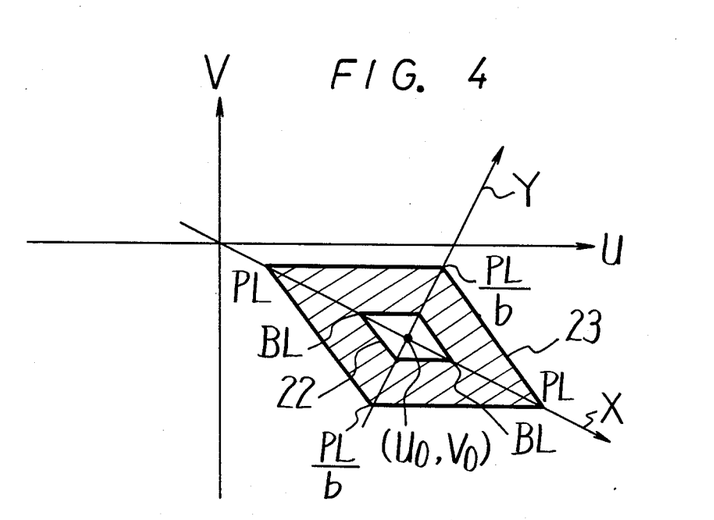
FIG. 4 is a graph used to explain how a key signal is generated.

A conventional method for generating a key signal will be described with reference to FIG. 4. If a reference point corresponding to a back color is taken as ($U_0$, $V_0$) in an U-V chroma signal coordinate in FIG. 4, the axis connecting an origin or original point with such reference point is made as an axis x and an axis perpendicular to the axis x and passing through the reference point ($U_0$, $V_0$) is made as an axis y. If components X and Y of a vector formed by connecting the reference point ($U_0$, $V_0$) and a desired point U, V which components relate to the axes x and y, x and y are expressed as $$x = (U - U_0) \cos \theta + (V - V_0) \sin \theta$$

$$y = (V - V_0) \cos \theta - (U - U_0) \sin \theta$$

where $\theta = \tan^{-1}(V_0/U_0)$.

Therefore it is a conventional method to define a key signal by a function expressed as in the following equation.

$$K = a|x| + b|y|$$

(a and b are desired positive constants).

If K in the left is given as a constant value $K_0$, a value of the desired point U and V to satisfy the value is arranged on the sides of a lozenge.

Figure 5A:
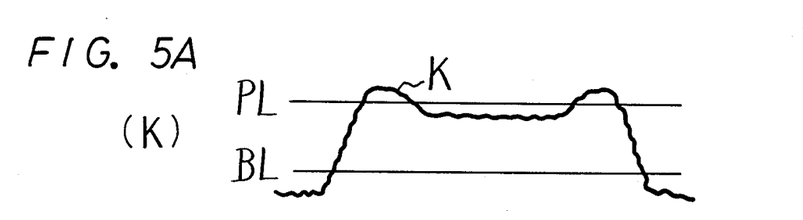
FIGS. 5A through 5C are respectively waveform diagrams used to explain a key processor.
Figure 5B:
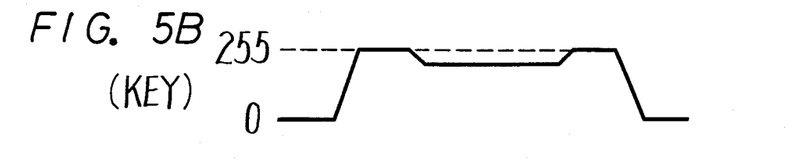
Figure 5C:
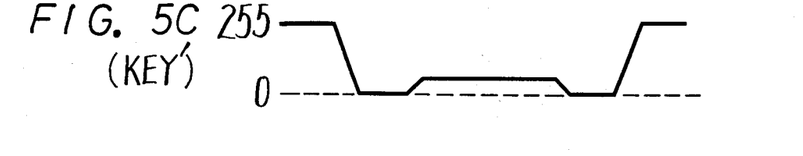

The soft keying operation will be described briefly with reference to FIGS. 5A through 5C. When the foreground 15 where the object 14 of, for example, the transparent, as glass is put in front of the back screen 13 is picked up, the back color is seen through the center of the glass so that as shown in FIG. 5A, a signal K whose level is increased in association with the outline of the object 14 and is reduced at the center of the glass is derived from the key signal generator 3. Although FIGS. 5A thrugh 5C represent conveniently the key signal as the analog waveform for the sake of the explanation, the key signal is digital data since the aforesaid digital chromakey apparatus in fact deals with the data in which one sample of 8 bits that can provide 255 different gradations, points, is sequentially arrayed at each sampling period. Whereas, the clipper (not shown) excutes the clipping operation which takes base clipping level BL and peak clipping level PL as threshold levels thus generating the soft keying key signal KEY as shown in FIG. 5B.

As stated above, in case of the transparent object 14, the soft keying operation is capable of generation of the key signal corresponding satisfactorily to the back color seen through the transparent object 14 or to the reflected light from the back screen 13 that impinges on the object 14.

By the way, a locus drawn from the reference point ($U_0$, $V_0$) to a position corresponding to a color of the object 14 is not generally presented as a straight line. This is mainly due to noise inherently contained in the color video data, and when such data is digitized, quantum noise is added thereto so that a zigzag movement of the aforesaid locus is intensified. Particularly when a direction where apexes of the lozenge in U-V chroma signal coordinates as shown in FIG. 4 are connected, namely, x-axis direction or y-axis direction is coincident with the above locus, the inclined portions or slopes of the key signal are not smoothly varied due to the zigzag movement thereof, resulting in such a problem that a picture quality of the mixed output picture is poor.

Figure 6A:
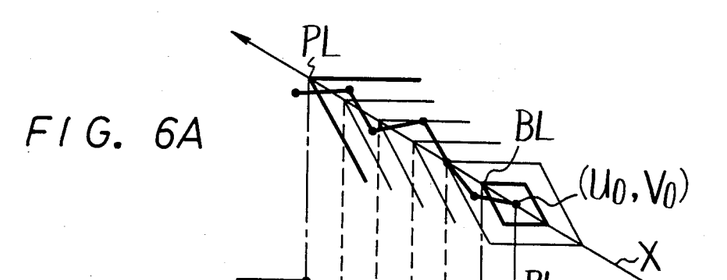
FIGS. 6A and 6B are graphs used to explain how a key signal is generated from a prior art key signal generator.
Figure 6B:
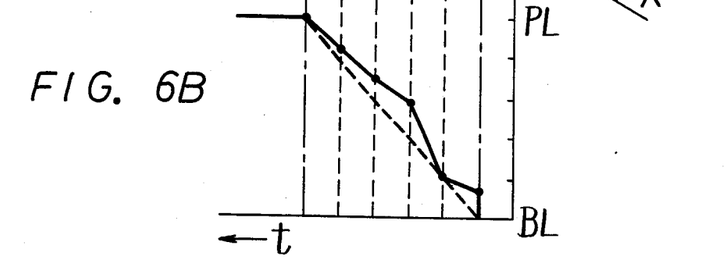

Let us assume that as shown in FIG. 6A a level change of six steps exists between the base clip level BL and the peak clip level PL, and the locus drawn along the axis x from the reference point ($U_0$, $V_0$) to the position of color of the object. Then, when there is no noise and the locus presents the straight line movement, the slopes of the key signal become a straight line as shown by a broken line in FIG. 6B. But, when as shown in FIG. 6A the locus is drawn as the zigzag line by the noise, the slopes of the key signal are no longer presented as the straight line thus unevenness is produced, as shown by a solid line in FIG. 6B.

OBJECTS OF THE INVENTION

Accordingly, an object of the invention is to provide an improved digital chromakey apparatus which can obviate the aforesaid defects inherent in a prior art digital chromakey apparatus.

Another object of the invention is to provide a key signal generator which can make an edge of a key signal smooth.

Still another object of the invention is to provide a key signal generator which comprises means for allowing an edge portion of a key signal disordered by noise to be approximated to a straight line.

SUMMARY OF THE INVENTION

According to an aspect of the invention, there is provided a key signal generator for generating a key signal which can prevent a noise component from causing undue departure of the slope of the key signal from a straight line. In accordance with the invention, unlike the conventional straight line, contours formed by connecting points at same levels in an U-V chromaticity coordinate to form edges of the key signal are made as quadratic curves.

The other objects, features and advantages of the present invention will become apparent from the following description taken in conjunction with the accompanying drawings through which the like references designate the same elements and parts.

DESCRIPTION OF THE PREFERRED EMBODIMENT

Figure 7:
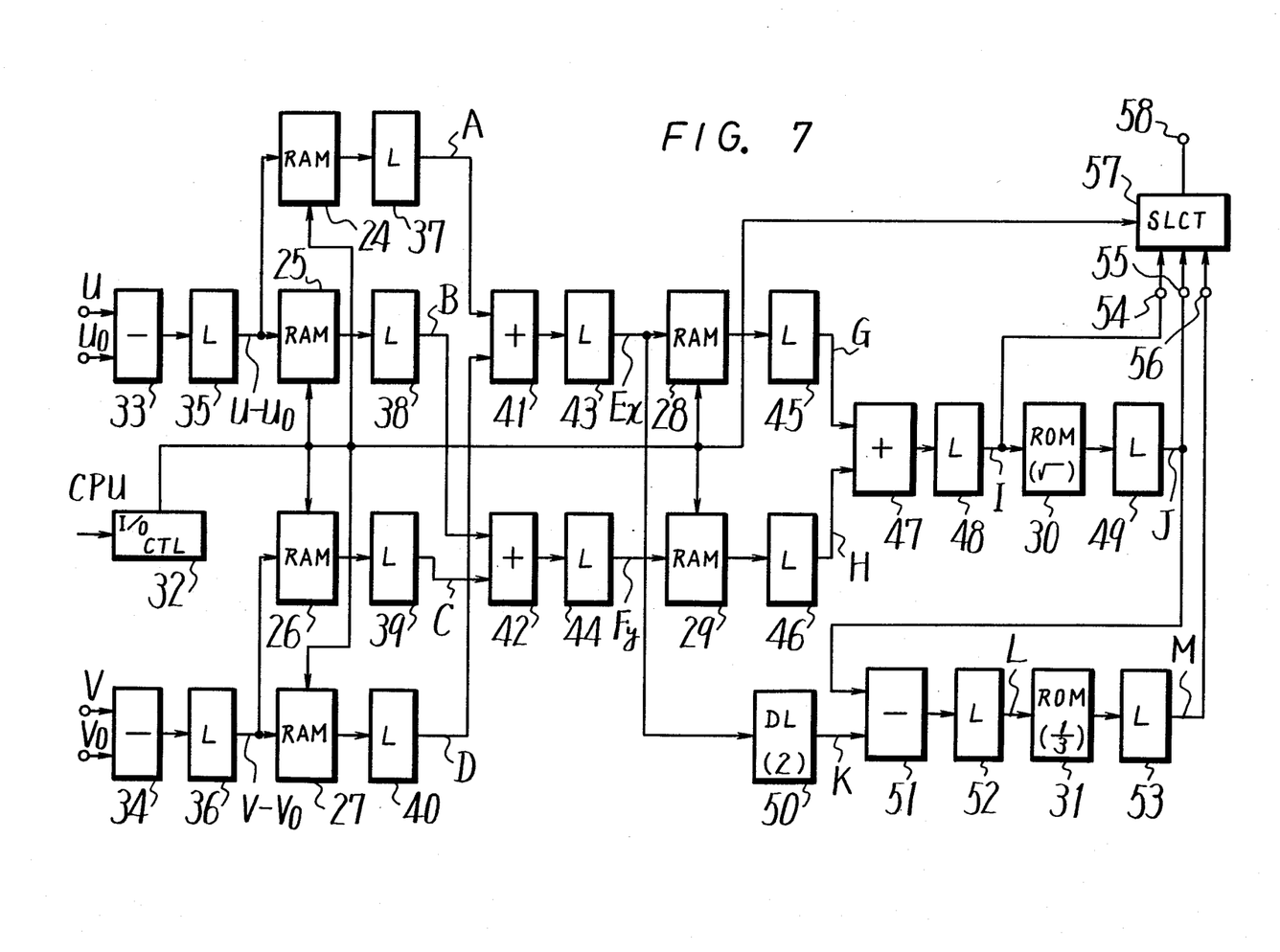
FIG. 7 is a block diagram schematically showing one embodiment of a key signal generator according to the invention.

An embodiment of this invention will be described hereinafter. FIG. 7 shows an overall arrangement of a key signal generating apparatus to which this invention is applied. In the figure, numerals 24, 25, 26, 27, 28 and 29 respectively denote random access memories (hereinafter, simply referred to RAMs), each being located to serve as a peripheral memory of a microcomputer. Data, address and control signals from a central processing unit (hereinafter, simply called CPU) are supplied thereto by way of an I/O controller 32 and a map memorized in each of the RAMs 24, 25, 26, 27, 28 and 29 becomes a predetermined one thereby. In other words, the modification of a reference point (reference hue ($U_0$, $V_0$)) and the kind of quadratic curve group renew or rewrite the RAM.

Figure 8A:
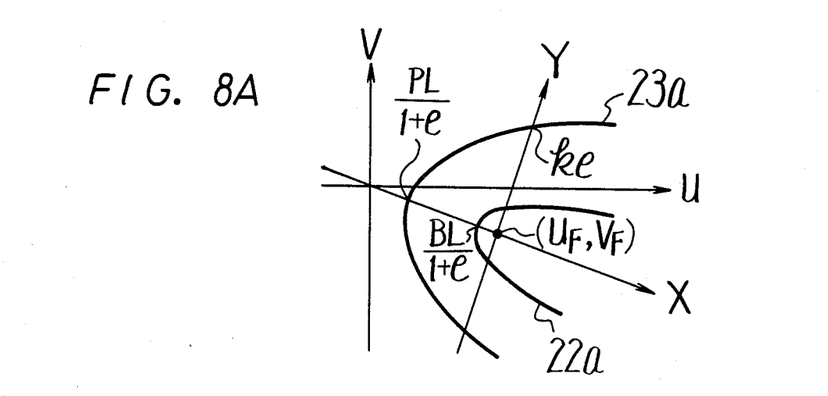
FIGS. 8A through 8C and FIGS. 9A and 9B are graphs used to explain how key signals are generated from a key signal generator, to which the invention is applied.
Figure 8B:
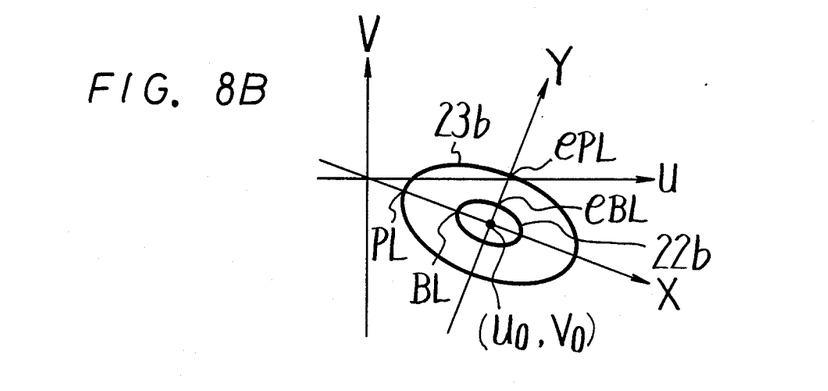
Figure 8C:
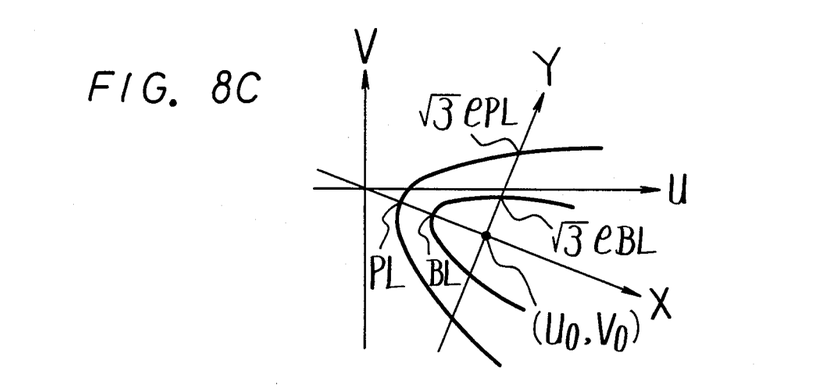

As the quadratic curve group, any one of three kinds thereof shown in FIGS. 8A to 8C is employed. First one is a polar coordinate quadratic curve system as shown in FIG. 8A, and an equation to produce a key signal is given by $$K = r - ex \quad (e > 0)$$

where $$r = \sqrt{(U - U_0)^2 + (V - V_0)^2}$$

$$x = (U - U_0)\cos\theta + (V - V_0)\sin\theta$$

$$\theta = \tan^{-1}\left(\frac{V_0}{U_0}\right)$$

Geometrically, r may be regarded as the hypotenuse of a right triangle, r having end points ($U_0$, $V_0$) and (U, V), and the other sides of the right triangle being ($U_0 - U$) and ($V_0 - V$), and ($U_F$, $V_F$) represents a focus of the quadratic curve. Moreover, a peak clip level PL and a base clip level BL become the quadratic curves which take the point ($U_F$, $V_F$) as their focus and are expressed by $$r = \frac{Ke}{1 - e\cos\theta}$$

These quadratic curves become circles when $e \approx 0$ is established, ellipses when $0 < e - 1$ is established, parabolas when $e = 1$ is established and hyperbolas when $e < 1$ is established. The value of e is thus a measure of the eccentricity of the curve. In FIG. 8A parabolas 22a and 23a are shown. A space or distance between the peak clip level PL and the base clip level BL is represented as a linear inclination.

The second is an ellipse system shown in FIG. 8B, and the key signal is generated by the following equation.

$$K = \sqrt{x^2 + \left(\frac{y}{e}\right)^2}$$

where $$x = (U - U_0)\cos\theta + (V - V_0)\sin\theta$$

$$y = (V - V_0)\cos\theta - (U - U_0)\sin\theta$$

$$\theta = \tan^{-1}\left(\frac{V_0}{U_0}\right)$$

The peak clip level PL and the base clip level BL on the U, V plane becomes ellipses 22a and 23b, respectively, each being expressed by the following equation taking the point ($U_0$, $V_0$) as their center.

$$\frac{x^2}{k^2} + \frac{y^2}{(ek)^2} = 1$$

Third is a hyperbola system as shown in FIG. 8C, and the key signal is generated by the following equation.

$$K = \frac{-2x + \sqrt{x^2 + 3(y/e)^2}}{3}$$

In this equation, x and y are the same as those of the above equation.

In the coordinate where ($U_0$, $V_0$) become (2k, 0), the peak clip level PL and the base clip level BL on the U, V plane become hyperbolas and are expressed as $$\frac{x^2}{k^2} - \frac{y^2}{(ek)^2} = 1$$

In the circuit arrangement shown in FIG. 7, to subtractors 33 and 34 at the input side are supplied one sample U and V of input video data and one sample of reference hue data $U_0$ and $V_0$ whereby respective subtracted outputs ($U - U_0$) and ($V - V_0$) are latched to latches 35 and 36, and then applied to the RAMs 24 to 27. In accordance with look-up tables previously written in the RAMs 24 to 27, output data A, B, C and D are generated therefrom and latched to latches 37, 38, 39 and 40. Calculations of (A+D) and (B+C) are carried out by adders 41 and 42 the outputs of which are fed to latches 43 and 44 which then produce at their outputs added outputs $E_x$ and $F_y$, respectively.

These added outputs $E_x$ and $F_y$ are supplied to the RAMs 28 and 29 and output data G and H converted by the look-up tables previously written therein are produced through latches 45 and 46 at their outputs. These outputs G and H are added by an adder 47 so that an output I(=G+H) is produced through a latch 48 at an output terminal 54. At this output terminal 54 appears the signal formed by the first polar coordinate quadratic curve system.

The output I of the latch 48 is supplied to a read-only memory (hereinafter, called ROM) 30 for producing a square root and of which the output J is latched to a latch 49, and then produced at an output terminal 55. This output J is the key signal generated on the basis of the second ellipse system.

Moreover, the output $E_x$ of the latch 43 is supplied to a delay circuit 50 for phase-matching. An output k thereof is supplied to a subtractor 51, where it is subtracted from the output J of the latch 49 and a subtracted output L is produced through a latch 52. Since the delay circuit 50 also has a function to double the level of data, the output L of the latch 52 becomes $J - K = J - 2E$. This output L is multiplied by 1/3 by a ROM 31 so that an output M(=⅓L) is produced through a latch 53 and then delivered to an output terminal 56. This output M is the key signal generated on the basis of the hyperbola system mentioned before.

The outputs I, J and M produced at the aforesaid three output terminals 54, 55 and 56, respectively, are supplied to the inside side of a selector 57, and the selector 57 is controlled by a control signal from the microcomputer to permit the key signal based upon a desired system to be produced at an output terminal 58.

In the case of the polar coordinate quadratic curve system, the output data B and C of the RAMs 25 and 26 become $(U - U_0)^2$ and $(V - V_0)^2$, respectively. Thus the data of these RAMs 25 and 26 are specified in such manner that the RAM 29 produces a square root of the added output F therebetween.

In accordance with the ellipse system and the hyperbola system, the RAMs 25 and 26 produce outputs of $-(U-U_0)\sin\theta$ and $(V-V_0)\cos\theta$, respectively so that the output $F_x$ of the latch 44 becomes the added output therebetween, namely, the output y. In the case of the ellipse system, the RAM 28 forms data $x^2$ and the RAM 29 forms data $y^2/e$ so that a square root of the added output of both data as described above is formed by the ROM 30.

In the case of the hyperbola system, the RAM 28 forms data $x^2$ and the RAM 29 forms data of $H=3(y/e)^2$ so that the ROM 30 produces the output $$J\left(=\sqrt{x^2 + 3\left(\frac{y}{e}\right)^2}\right)$$

of the square root of the added output therebetween. Whereas, the delay circuit 50 generates data K of 2x, the subtractor 51 forms the subtracted output $(L=J-K)$ therebetween, and further multiplied by the coefficient $\frac{1}{3}$ by the ROM 31.

Figure 9A:
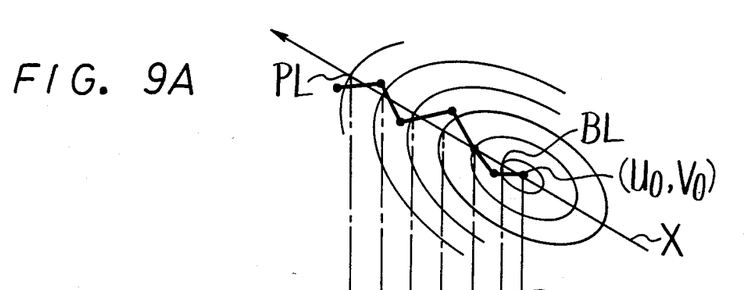
Figure 9B:
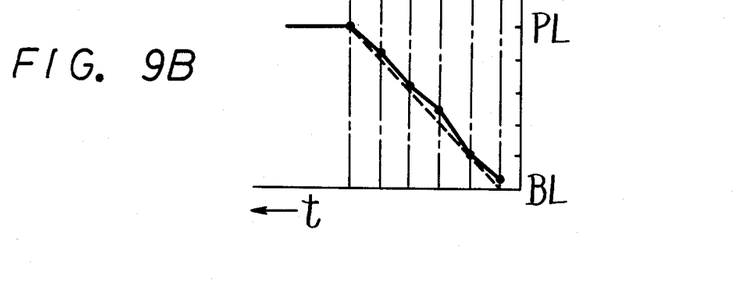

In one embodiment of this invention as described above, taking a case where the contours of the base clip level BL, the peak clip level PL and the slope therebetween are ellipses as an example, even if the movement from the reference hue to the object is a zigzag movement as shown in FIG. 9A, as is obvious from FIG. 9B, the inclination of the generated key signal is more linear compared with that of the prior art. This is because this invention can reduce the level change amount of the key signal even though the hue of data in the slope portion thereof is varied in the different direction.

As is clear from the description of the aforementioned embodiment, in accordance with this invention, since the contour formed by connecting the points at which the level of the key signal becomes the same is made by the quadratic curve, even if the data at the boundary portion between the back screen and the object contains the noise, it is possible to reduce the influence of such noise and form the key signal so that the slope or edge portion thereof changes linearly. Thus a picture mixed by such key signal has a satisfactory outline.

While the embodiment of this invention is applied to the U-V chroma signal coordinates, it is obvious that the present invention can be similarly applied to other I/Q chroma signal coordinates and so on.

The above description is of a single preferred embodiment of the invention, but it will be apparent that many modifications and variations could be effected by one skilled in the art without departing from the spirt or scope of the novel concepts of the invention, so that the scope of the invention should be determined by the appended claims only.

What is claimed is:

1. A chromakey system for mixing a first video signal with a second video signal in accordance with a key signal; said system comprising:
   means for determining the difference between a reference hue data sample and a hue data sample of said first video signal in U-V chroma signal coordinates; and
   means for generating said key signal having a magnitude which is determined according to a predetermined quadratic curve relationship based upon said difference.

2. A chromakey system which is arranged for mixing a first video signal with a second video signal in accordance with a key signal; said system comprising:
   means for generating said key signal having a magnitude which is determined according to a predetermined quadratic curve relationship based upon a difference between a reference hue data sample and a hue data sample of said first video signal in U-V chroma signal coordinates;
   wherein said means for generating said key signal comprises:
   means receiving hue point data samples (U, V) of an input video data signal and reference hue point data samples ($U_0$, $V_0$) of said input video data signal, in U-V chroma signal coordinates for producing data signals $U-U_0$ and $V-V_0$ therefrom;
   means for converting said data signals $U-U_0$ and $V-V_0$ into data signals $(U-U_0)^2$ and $(V-V_0)^2$, respectively, and adding the same so as to produce an output data signal $(U-U_0)^2+(V-V_0)^2$;
   means for generating a square root of said data signal $(U-U_0)^2+(V-V_0)^2$;
   means for converting said data signal $U-U_0$ and $V-V_0$ into data signals $(U-U_0)\cos\theta$ and $(V-V_0)\sin\theta$, respectively, and adding the same so as to produce data signal $(U-U_0)\cos\theta+(V-V_0)\sin\theta$ when $\theta=\tan^{-1}(V_0/U_0)$
   means for multiplying said data signal $(U-U_0)\cos\theta+(V-V_0)\sin\theta$ by $-e$ ($e\geq 0$); and
   means for adding an output of said square root generating means with an output of said multiplying means, whereby an output of said last-mentioned adding means is said magnitude of said key signal.

3. A chromakey system which is arranged for mixing a first video signal with a second video signal in accordance with a key signal; said system comprising:
   means for generating said key signal having a magnitude which is determined according to a predetermined quadratic curve relationship based upon a difference between a reference hue data sample and a hue data sample of said first video signal in U-V chroma signal coordinates;
   wherein said means for generating said key signal comprises:
   means receiving a hue point data signal (U, V) of an input video data signal and a reference hue point data signal ($U_0$, $V_0$), respectively, in U-V chroma signal coordinates for producing data signals $U-U_0$ and $V-V_0$ therefrom;
   means for converting said data signals $U-U_0$ and $V-V_0$ into data signals $-(U-U_0)\sin\theta$ and $(V-V_0)\cos\theta$ and adding the same so as to produce an output data signal $(V-V_0)\cos\theta-(U-U_0)\sin\theta$ when $\theta=\tan^{-1}(V_0/U_0)$;
   means for converting said data signals $U-U_0$ and $V-V_0$ into data signals $(U-U_0)\cos\theta$ and $(V-V_0)\sin\theta$, respectively, and adding the same so as to produce an output data signal $(U-U_0)\cos\theta+(V-V_0)\sin\theta 1$
   means for multiplying said output data signal $(V-V_0)\cos\theta(U-U_0)\sin\theta$ by $1/e$ and then squaring the same;
   means for squaring said output data signal $(U-U_0)\cos\theta+(V-V_0)\sin\theta$;

means for adding an output data signal of said multiplying means with an output data signal of said squaring means; and means for generating a square root on the basis of said added output data signals, whereby an output of said last-mentioned means is said magnitude of said key signal.

4. A chromakey system which is arranged for mixing a first video signal with a second video signal in accordance with a key signal; said system comprising:

means for generating said key signal having a magnitude which is determined according to a predetermined quadratic curve relationship based upon a difference between a reference hue data sample and a hue data sample of said first video signal in U-V chroma signal coordinates;

wherein said means for generating said key signal comprises:

means receiving a hue point data signal (U, V) of an input video data signal and a reference point data signal ($U_0$, $V_0$), respectively, in U-V chroma signal coordinates for producing data signals $U-U_0$ and $V-V_0$ therefrom;

first means for converting said data signals $U-U_0$ and $V-V_0$ into data signals $-(U-U_0)\sin\theta$ and $(V-V_0)\cos\theta$ and adding the same so as to produce an output data signal $(V-V_0)\cos\theta$ $(U-U_0)\sin\theta$ when $\theta=\tan^{-1}(V_0/U_0)$;

second means for converting said data signals $U-U_0$ and $V-V_0$ into data signals $(U-U_0)\cos\theta$ and $(V-V_0)\sin\theta$, respectively, and adding the same so as to produce an output data signal $(U-U_0)\cos\theta(V-V_0)\sin\theta$;

means for multiplying and squaring an output of said first converting means, by first squaring and then multiplying the same by n times;

means for squaring an output of said second converting means;

means for adding an output of said multiplying means with an output of said squaring means including means for producing a square root therefrom;

means for multiplying an output data signal of said second-mentioned converting means by $-2$ and adding the same with an output signal of said adding means; and means for multiplying an output signal of said last-mentioned multiplying means by $1/n$, whereby an output of said adding means is said magnitude of said key signal.

5. A chromakey system according to claim 1, wherein said quadratic relationship is an ellipse.

6. A chromakey system according to claim 1, wherein said quadratic relationship is a hyperbola.

7. A chromakey system according to claim 1, wherein said quadratic relationship is a parabola.

8. A chromakey system according to claim 1, wherein said quadratic relationship is a circle.

9. Key signal generating apparatus for use in a digital chromakey system, comprising:

signal processing means receiving at least one sample of an input video data signal (U, V) and one sample of a reference hue data signal ($U_0$, $V_0$) for calculating predetermined signal values therefrom and producing two added output signals ($E_x$, $F_y$);

random access memory means including a plurality of look-up tables of conversion data receiving said added output signals and producing converted first and second output signals therefrom;

first calculator means connected to receive said converted first and second output signals for performing predetermined mathematical operations thereon and producing an output signal representing a polar coordinate quadratic curve system;

second calculator means receiving said output signal representing said polar coordinate quadratic curve system for performing predetermined mathematical operations thereon and producing an output signal representing an elliptical curve system;

third calculator means connected to receive said output signal representing said elliptical curve system and said first added output signal from said signal processing means for performing predetermined mathematical operations thereon and producing an output signal representing a hyperbolic curve system; and selector means connected to receive said signal representing a polar coordinate quadratic curve system, said signal representing an elliptical curve system, and said signal representing an hyperbolic curve system for selecting one as said key signal, in which the contours of said key signal are defined by quadratic equations according to one of said curve systems in chroma signal coordinates.

10. Apparatus according to claim 9, in which said first calculator means comprises signal adders for adding said output signals from said random access memory means to form said key signal defined by said polar coordinate quadratic curve system in chroma signal coordinates.

11. Apparatus according to claim 9, in which said second calculator means comprises read only memory means for deriving a square root from a signal input thereto and generating said key signal on the basis of an elliptical curve system of quadratic curves in chroma signal coordinates.

12. Apparatus according to claim 9, in which said third calculator means comprises subtraction means for deriving a signal difference between said two input signals and further comprises a read only memory means for dividing said signal difference by three to produce said key signal generated on the basis of said hyperbolic curve system of quadratic curves in chroma signal coordinates.

13. Apparatus according to claim 9, further comprising control signal means for controlling the operation of said signal processing means, said random access memory means, and said first, second, and third calculator means, and said selecting means.

14. Apparatus according to claim 9, in which said signal processing means includes subtraction means for producing difference signals by subtracting respective ones of said samples of input video data signal and respective ones of said samples of reference hue data signal and for supplying said difference signals to a second plurality of random access memory means each containing respective lookup tables for performing selected mathematical operations on said difference signals.

* * * * *